US012033472B2

(12) United States Patent
Chesworth et al.

(10) Patent No.: US 12,033,472 B2
(45) Date of Patent: Jul. 9, 2024

(54) GAMING MACHINE AND METHOD WITH SYMBOL ARRAY UNLOCKING FEATURE

(71) Applicant: LNW Gaming, Inc., Las Vegas, NV (US)

(72) Inventors: Jack Chesworth, Newtown (AU); Yanis Tsombanidis, Las Vegas, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 395 days.

(21) Appl. No.: 17/550,120

(22) Filed: Dec. 14, 2021

(65) Prior Publication Data

US 2023/0186729 A1 Jun. 15, 2023

(51) Int. Cl.
*G07F 17/00* (2006.01)
*G07F 17/32* (2006.01)

(52) U.S. Cl.
CPC ...... *G07F 17/3267* (2013.01); *G07F 17/3213* (2013.01); *G07F 17/3244* (2013.01)

(58) Field of Classification Search
None
See application file for complete search history.

(56) References Cited

U.S. PATENT DOCUMENTS

| | | | |
|---|---|---|---|
| 3,733,075 | A | 5/1973 | Hooker et al. |
| 4,198,052 | A | 4/1980 | Gauselmann |
| 4,732,386 | A | 3/1988 | Rayfiel |
| 5,100,137 | A | 3/1992 | Fulton |
| 5,152,529 | A | 10/1992 | Okada |
| 5,205,555 | A | 4/1993 | Hamano |
| 5,342,047 | A | 8/1994 | Heidel et al. |
| 5,356,140 | A | 10/1994 | Dabrowski et al. |
| 5,393,061 | A | 2/1995 | Manship et al. |
| 5,395,111 | A | 3/1995 | Inoue |
| 5,431,408 | A | 7/1995 | Adams |
| 5,511,781 | A | 4/1996 | Wood et al. |
| 5,618,232 | A | 4/1997 | Martin |
| 5,695,188 | A | 12/1997 | Ishibashi |
| 5,704,835 | A | 1/1998 | Dietz |

(Continued)

FOREIGN PATENT DOCUMENTS

| | | | |
|---|---|---|---|
| AU | 2001055957 | A1 | 3/2002 |
| AU | 2013251288 | A1 | 5/2014 |

(Continued)

OTHER PUBLICATIONS

Ancient Arcadia game brochure, Copyright 2011 IGT.

(Continued)

*Primary Examiner* — James S. McClellan
*Assistant Examiner* — Jeffrey K Wong

(57) ABSTRACT

There is provided a gaming system, gaming machine, and method that utilize an electronic display device configured to display a plurality of symbol arrays associated with respective sets of symbol-bearing reels. The arrays may be locked or unlocked. In response to a reel spin that generates a stack of value-bearing symbols in an unlocked array, a locked array is unlocked and the stack is held in its array for a number of subsequent reel spins, Payouts are provided for winning combinations of standard symbols and value-bearing symbols in the unlocked arrays.

18 Claims, 5 Drawing Sheets

(56) References Cited

U.S. PATENT DOCUMENTS

| | | | |
|---|---|---|---|
| 5,722,891 | A | 3/1998 | Inoue |
| 5,752,881 | A | 5/1998 | Inoue |
| 5,766,074 | A | 6/1998 | Cannon et al. |
| 5,788,573 | A | 8/1998 | Baerlocher et al. |
| 5,807,177 | A | 9/1998 | Takemoto et al. |
| 5,810,665 | A | 9/1998 | Takemoto et al. |
| 5,833,537 | A | 11/1998 | Barrie |
| 5,848,932 | A | 12/1998 | Adams |
| 5,855,515 | A | 1/1999 | Pease et al. |
| 5,876,284 | A | 3/1999 | Acres et al. |
| 5,882,259 | A | 3/1999 | Holmes et al. |
| 5,882,261 | A | 3/1999 | Adams |
| 5,890,962 | A | 4/1999 | Takemoto |
| 5,911,418 | A | 6/1999 | Adams |
| 5,947,820 | A | 9/1999 | Morro et al. |
| 5,951,397 | A | 9/1999 | Dickinson |
| 5,988,638 | A | 11/1999 | Rodesch et al. |
| 6,004,207 | A | 12/1999 | Wilson et al. |
| 6,027,115 | A | 2/2000 | Griswold et al. |
| 6,033,307 | A | 3/2000 | Vancura |
| 6,048,269 | A | 4/2000 | Burns et al. |
| 6,050,895 | A | 4/2000 | Luciano et al. |
| 6,056,642 | A | 5/2000 | Bennett |
| 6,089,976 | A | 7/2000 | Schneider et al. |
| 6,089,977 | A | 7/2000 | Bennett |
| 6,102,798 | A | 8/2000 | Bennett |
| 6,120,031 | A | 9/2000 | Adams |
| 6,142,873 | A | 11/2000 | Weiss et al. |
| 6,159,097 | A | 12/2000 | Gura |
| 6,162,121 | A | 12/2000 | Morro et al. |
| 6,168,520 | B1 | 1/2001 | Baerlocher et al. |
| 6,186,894 | B1 | 2/2001 | Mayeroff |
| 6,203,429 | B1 | 3/2001 | Demar et al. |
| 6,213,875 | B1 | 4/2001 | Suzuki |
| 6,224,482 | B1 | 5/2001 | Bennett |
| 6,224,483 | B1 | 5/2001 | Mayeroff |
| 6,224,484 | B1 | 5/2001 | Okuda et al. |
| 6,227,971 | B1 | 5/2001 | Weiss |
| 6,241,607 | B1 | 6/2001 | Payne et al. |
| 6,251,013 | B1 | 6/2001 | Bennett |
| 6,270,411 | B1 | 8/2001 | Gura et al. |
| 6,270,412 | B1 | 8/2001 | Crawford et al. |
| 6,290,600 | B1 | 9/2001 | Glasson |
| 6,309,300 | B1 | 10/2001 | Glavich |
| 6,319,124 | B1 | 11/2001 | Baerlocher et al. |
| 6,375,567 | B1 | 4/2002 | Acres |
| 6,375,570 | B1 | 4/2002 | Poole |
| 6,413,162 | B1 | 7/2002 | Baerlocher et al. |
| 6,481,713 | B2 | 11/2002 | Perrie et al. |
| 6,517,432 | B1 | 2/2003 | Jaffe |
| 6,537,150 | B1 | 3/2003 | Luciano et al. |
| 6,544,120 | B2 | 4/2003 | Ainsworth |
| 6,547,242 | B1 | 4/2003 | Sugiyama et al. |
| 6,551,187 | B1 | 4/2003 | Jaffe |
| 6,554,704 | B2 | 4/2003 | Nicastro et al. |
| 6,558,254 | B2 | 5/2003 | Baelocher et al. |
| 6,561,900 | B1 | 5/2003 | Baerlocher et al. |
| 6,561,904 | B2 | 5/2003 | Locke et al. |
| 6,565,434 | B1 | 5/2003 | Acres |
| 6,641,477 | B1 | 11/2003 | Dietz |
| 6,652,378 | B2 | 11/2003 | Cannon et al. |
| 6,656,040 | B1 | 12/2003 | Brosnan et al. |
| 6,657,923 | B2 | 12/2003 | Laughlin |
| 6,692,356 | B2 | 2/2004 | Baerlocher et al. |
| 6,702,675 | B2 | 3/2004 | Poole et al. |
| 6,731,313 | B1 | 5/2004 | Kaminkow |
| 6,786,818 | B1 | 9/2004 | Rothschild et al. |
| 6,832,957 | B2 | 12/2004 | Falconer |
| 6,837,790 | B1 | 1/2005 | Kaminkow |
| 6,869,360 | B2 | 3/2005 | Marks et al. |
| 6,896,617 | B2 | 5/2005 | Daly |
| 6,910,962 | B2 | 6/2005 | Marks et al. |
| 6,916,243 | B2 | 7/2005 | Yoshida |
| 6,918,834 | B2 | 7/2005 | Vancura |
| 6,926,609 | B2 | 8/2005 | Martin |
| 6,960,134 | B2 | 11/2005 | Hartl et al. |
| 7,018,293 | B2 | 3/2006 | Brown et al. |
| 7,029,395 | B1 | 4/2006 | Baerlocher |
| 7,029,396 | B2 | 4/2006 | Jaffe et al. |
| 7,121,945 | B2 | 10/2006 | Suganuma et al. |
| 7,147,559 | B2 | 12/2006 | Englman |
| 7,156,740 | B2 | 1/2007 | Kaminkow |
| 7,179,169 | B2 | 2/2007 | Beaulieu et al. |
| 7,252,591 | B2 | 8/2007 | Van Asdale |
| 7,316,613 | B2 | 1/2008 | Luccesi et al. |
| 7,371,170 | B2 | 5/2008 | Cregan et al. |
| 7,377,850 | B2 | 5/2008 | Shackelford et al. |
| 7,431,646 | B2 | 10/2008 | Jackson |
| 7,452,276 | B2 | 11/2008 | Loose et al. |
| 7,458,890 | B2 | 12/2008 | Loose et al. |
| 7,488,252 | B2 | 2/2009 | Griswold et al. |
| 7,503,847 | B2 | 3/2009 | Baerlocher |
| 7,526,736 | B2 | 4/2009 | Kaminkow et al. |
| 7,553,231 | B2 | 6/2009 | Rodgers et al. |
| 7,578,735 | B2 | 8/2009 | Frizzell et al. |
| 7,601,062 | B2 | 10/2009 | Cole et al. |
| 7,604,538 | B2 | 10/2009 | Pacey |
| 7,618,319 | B2 | 11/2009 | Casey et al. |
| 7,625,278 | B2 | 12/2009 | Paulsen et al. |
| 7,654,895 | B2 | 2/2010 | Pacey |
| 7,654,899 | B2 | 2/2010 | Durham et al. |
| 7,699,699 | B2 | 4/2010 | Gilliland et al. |
| 7,704,141 | B1 | 4/2010 | Marks et al. |
| 7,744,460 | B2 | 6/2010 | Walker et al. |
| 7,785,191 | B2 | 8/2010 | Marks et al. |
| 7,789,744 | B2 | 9/2010 | Fiden |
| 7,841,934 | B2 | 11/2010 | Gauselmann |
| 7,963,846 | B2 | 6/2011 | Englman et al. |
| 7,980,936 | B2 | 7/2011 | Mead |
| 8,021,223 | B2 | 9/2011 | Rose |
| 8,021,225 | B2 | 9/2011 | Okada |
| 8,038,528 | B2 | 10/2011 | Englman et al. |
| 8,066,563 | B1 | 11/2011 | Schultz et al. |
| 8,083,581 | B2 | 12/2011 | Marks et al. |
| 8,105,145 | B2 | 1/2012 | Jaffe |
| 8,105,151 | B2 | 1/2012 | Caputo et al. |
| 8,113,940 | B2 | 2/2012 | Hornik |
| 8,147,322 | B2 | 4/2012 | Walker et al. |
| 8,162,740 | B2 | 4/2012 | Aoki |
| 8,162,741 | B2 | 4/2012 | Wadleigh et al. |
| 8,192,275 | B2 | 6/2012 | Aoki et al. |
| 8,246,442 | B1 | 8/2012 | Barrie |
| 8,272,938 | B2 | 9/2012 | Gilmore et al. |
| 8,287,357 | B2 | 10/2012 | Evans |
| 8,323,091 | B2 | 12/2012 | Frank et al. |
| 8,357,041 | B1 | 1/2013 | Saunders |
| 8,360,851 | B2 | 1/2013 | Aoki et al. |
| 8,366,538 | B1 | 2/2013 | Saunders et al. |
| 8,371,930 | B1 | 2/2013 | Saunders et al. |
| 8,388,432 | B2 | 3/2013 | Mattice et al. |
| 8,414,380 | B2 | 4/2013 | Saunders et al. |
| 8,465,358 | B2 | 6/2013 | Kemper |
| 8,496,522 | B2 | 7/2013 | Caputo et al. |
| 8,512,121 | B2 | 8/2013 | Macvittie et al. |
| 8,512,124 | B2 | 8/2013 | Bramble et al. |
| 8,512,138 | B2 | 8/2013 | Saunders |
| 8,523,659 | B2 | 9/2013 | Evans |
| 8,574,059 | B2 | 11/2013 | Rodgers et al. |
| 8,602,868 | B2 | 12/2013 | Johnson et al. |
| 8,608,545 | B2 | 12/2013 | Arora et al. |
| 8,662,986 | B2 | 3/2014 | Rodgers et al. |
| 8,678,908 | B2 | 3/2014 | Nicely |
| 8,690,660 | B2 | 4/2014 | Saunders et al. |
| 8,696,434 | B2 | 4/2014 | Tsukahara |
| 8,702,487 | B2 | 4/2014 | Thomas |
| 8,790,169 | B2 | 7/2014 | Saunders |
| 8,795,059 | B2 | 8/2014 | Aoki et al. |
| 8,821,254 | B2 | 9/2014 | Tsukahara |
| 8,834,258 | B2 | 9/2014 | Gobe et al. |
| 8,851,974 | B2 | 10/2014 | Caputo et al. |
| 8,870,642 | B2 | 10/2014 | Leupp et al. |
| 8,882,578 | B2 | 11/2014 | Saunders |
| 8,961,291 | B2 | 2/2015 | Dias Pires et al. |
| 9,005,022 | B2 | 4/2015 | Saunders |

(56) References Cited

U.S. PATENT DOCUMENTS

| | | | |
|---|---|---|---|
| 9,011,233 | B2 | 4/2015 | Ryan |
| 9,098,847 | B2 | 8/2015 | Basallo et al. |
| 9,098,973 | B2 | 8/2015 | Basallo et al. |
| 9,147,321 | B2 | 9/2015 | Moody |
| 9,165,433 | B2 | 10/2015 | Caputo |
| 9,177,447 | B2 | 11/2015 | Zoltewicz et al. |
| 9,202,345 | B2 | 12/2015 | Zoltewicz et al. |
| 9,214,011 | B2 | 12/2015 | Wei et al. |
| 9,230,410 | B2 | 1/2016 | Saunders et al. |
| 9,245,421 | B2 | 1/2016 | Saunders et al. |
| 9,251,667 | B2 | 2/2016 | Marks et al. |
| 9,257,017 | B2 | 2/2016 | Saunders et al. |
| 9,262,895 | B2 | 2/2016 | Rodgers et al. |
| 9,275,524 | B2 | 3/2016 | Nicely |
| 9,299,224 | B2 | 3/2016 | Leupp |
| 9,311,781 | B2 | 4/2016 | Edwards |
| 9,349,251 | B2 | 5/2016 | Caputo et al. |
| 9,355,528 | B2 | 5/2016 | Nicely |
| 9,418,521 | B1 | 8/2016 | Henrick et al. |
| 9,424,720 | B2 | 8/2016 | Suda |
| 9,430,900 | B2 | 8/2016 | Zoltewicz et al. |
| 9,466,169 | B2 | 10/2016 | Basallo et al. |
| 9,474,972 | B2 | 10/2016 | Lenger |
| 9,495,839 | B2 | 11/2016 | Aoki et al. |
| 9,595,157 | B2 | 3/2017 | Rasmussen et al. |
| 9,633,506 | B2 | 4/2017 | Basallo et al. |
| 9,704,342 | B2 | 7/2017 | Aoki et al. |
| 9,928,691 | B2 | 3/2018 | Olive |
| 10,013,855 | B2 | 7/2018 | Nakamura |
| 10,037,651 | B2 | 7/2018 | You et al. |
| 10,043,350 | B2 | 8/2018 | Gomez et al. |
| 10,062,237 | B2 | 8/2018 | Devine et al. |
| 10,204,473 | B2 | 2/2019 | Lenger |
| 10,242,533 | B2 | 3/2019 | Okada et al. |
| 10,339,761 | B2 | 7/2019 | Olive |
| 10,366,575 | B2 | 7/2019 | Visser |
| 10,388,112 | B2 | 8/2019 | You et al. |
| 10,410,472 | B2 | 9/2019 | Moody |
| 10,417,877 | B2 | 9/2019 | Gomez et al. |
| 10,475,294 | B2 | 11/2019 | Gomez et al. |
| 10,497,203 | B2 | 12/2019 | Elmqvist |
| 10,672,220 | B2 | 6/2020 | Lenger |
| 10,706,664 | B2 | 7/2020 | Boese et al. |
| 10,726,676 | B2 | 7/2020 | You et al. |
| 10,769,888 | B2 | 9/2020 | You et al. |
| 10,839,648 | B2 | 11/2020 | Okada et al. |
| 10,957,161 | B2 | 3/2021 | Chesworth et al. |
| 11,017,638 | B2 | 5/2021 | Chesworth et al. |
| 2001/0021666 | A1 | 9/2001 | Yoshida et al. |
| 2002/0016200 | A1 | 2/2002 | Baerlocher et al. |
| 2002/0045474 | A1 | 4/2002 | Singer et al. |
| 2002/0119818 | A1 | 8/2002 | Savio et al. |
| 2002/0155881 | A1 | 10/2002 | Yoshida |
| 2002/0183105 | A1 | 12/2002 | Cannon et al. |
| 2003/0017865 | A1 | 1/2003 | Beaulieu et al. |
| 2003/0027619 | A1 | 2/2003 | Nicastro, Sr. |
| 2003/0035346 | A1 | 2/2003 | Laughlin |
| 2003/0064782 | A1 | 4/2003 | Beaulieu et al. |
| 2003/0064801 | A1 | 4/2003 | Breckner et al. |
| 2003/0064802 | A1 | 4/2003 | Rodgers et al. |
| 2003/0069063 | A1 | 4/2003 | Bilyeu et al. |
| 2003/0130034 | A1 | 7/2003 | Suganuma et al. |
| 2003/0157980 | A1 | 8/2003 | Loose et al. |
| 2003/0216165 | A1 | 11/2003 | Singer et al. |
| 2004/0012145 | A1 | 1/2004 | Inoue |
| 2004/0023714 | A1 | 2/2004 | Asdale |
| 2004/0043815 | A1 | 3/2004 | Kaminkow |
| 2004/0048646 | A1 | 3/2004 | Visocnik |
| 2004/0092315 | A1 | 5/2004 | Boyd et al. |
| 2004/0137982 | A1 | 7/2004 | Cuddy et al. |
| 2004/0171417 | A1 | 9/2004 | Beaulieu et al. |
| 2004/0198489 | A1 | 10/2004 | Kaminkow et al. |
| 2005/0054442 | A1 | 3/2005 | Anderson et al. |
| 2005/0130731 | A1 | 6/2005 | Englman et al. |
| 2005/0159208 | A1 | 7/2005 | Pacey |
| 2006/0009286 | A1 | 1/2006 | Durham et al. |
| 2006/0063588 | A1 | 3/2006 | Poole |
| 2006/0111173 | A1 | 5/2006 | Yang |
| 2006/0142080 | A1 | 6/2006 | Enzminger |
| 2006/0189369 | A1 | 8/2006 | Taylor |
| 2006/0205469 | A1 | 9/2006 | Schultz et al. |
| 2006/0247002 | A1 | 11/2006 | Yoshimi et al. |
| 2007/0060248 | A1 | 3/2007 | Rodgers et al. |
| 2007/0060255 | A1 | 3/2007 | Baerlocher et al. |
| 2007/0060275 | A1 | 3/2007 | Gilmore et al. |
| 2007/0129135 | A1 | 6/2007 | Marks et al. |
| 2007/0149267 | A1 | 6/2007 | Ross et al. |
| 2007/0281784 | A1 | 12/2007 | Seelig et al. |
| 2007/0287529 | A1 | 12/2007 | Kojima |
| 2008/0003278 | A1 | 1/2008 | Mondelo |
| 2008/0004532 | A1 | 1/2008 | Rubey et al. |
| 2008/0032784 | A1 | 2/2008 | Englman |
| 2008/0045298 | A1 | 2/2008 | Yoshizawa |
| 2008/0045320 | A1 | 2/2008 | Kato |
| 2008/0108408 | A1 | 5/2008 | Wolf |
| 2008/0108411 | A1 | 5/2008 | Jensen et al. |
| 2008/0108422 | A1 | 5/2008 | Hedrick et al. |
| 2008/0108431 | A1 | 5/2008 | Cuddy et al. |
| 2008/0132321 | A1 | 6/2008 | Pau |
| 2008/0182647 | A1 | 7/2008 | Brunet De Courssou et al. |
| 2008/0274789 | A1 | 11/2008 | Singer et al. |
| 2009/0036208 | A1 | 2/2009 | Pennington et al. |
| 2009/0156287 | A1 | 6/2009 | Baumgartner |
| 2009/0181755 | A1 | 7/2009 | Gagner et al. |
| 2009/0239634 | A1 | 9/2009 | Nguyen |
| 2009/0291741 | A1 | 11/2009 | Schofield |
| 2010/0075737 | A1 | 3/2010 | Bluemel |
| 2010/0113133 | A1 | 5/2010 | Leupp |
| 2010/0167815 | A1 | 7/2010 | Gagner et al. |
| 2010/0203948 | A1 | 8/2010 | Falciglia, Sr. |
| 2010/0210343 | A1 | 8/2010 | Englman et al. |
| 2010/0234092 | A1 | 9/2010 | Gomez et al. |
| 2010/0304832 | A1 | 12/2010 | Kup-Ferroth |
| 2011/0244943 | A1 | 10/2011 | Milford et al. |
| 2011/0300937 | A1 | 12/2011 | Crowder, Jr. et al. |
| 2012/0015707 | A1 | 1/2012 | Hornik et al. |
| 2012/0034965 | A1 | 2/2012 | Masen et al. |
| 2012/0077564 | A1 | 3/2012 | Collette et al. |
| 2012/0094738 | A1 | 4/2012 | Aoki et al. |
| 2012/0122532 | A1 | 5/2012 | Berman et al. |
| 2012/0178517 | A1 | 7/2012 | Montenegro et al. |
| 2012/0220360 | A1 | 8/2012 | Kelly et al. |
| 2013/0053124 | A1 | 2/2013 | Masen et al. |
| 2013/0065663 | A1 | 3/2013 | Johnson et al. |
| 2013/0102375 | A1 | 4/2013 | Aoki et al. |
| 2013/0252704 | A1 | 9/2013 | Gilbertson et al. |
| 2013/0260861 | A1 | 10/2013 | Vann et al. |
| 2013/0324217 | A1 | 12/2013 | Gilbertson et al. |
| 2014/0014186 | A1 | 1/2014 | Bhattacharya et al. |
| 2014/0024429 | A1 | 1/2014 | Aoki et al. |
| 2014/0051496 | A1 | 2/2014 | Meyer |
| 2014/0141860 | A1 | 5/2014 | Meyer |
| 2014/0179396 | A1 | 6/2014 | Aoki et al. |
| 2014/0274292 | A1 | 9/2014 | Suda |
| 2014/0323198 | A1 | 10/2014 | Tuck |
| 2015/0031437 | A1 | 1/2015 | Gomez et al. |
| 2015/0170462 | A1 | 6/2015 | Berman et al. |
| 2015/0206386 | A1 | 7/2015 | Jaffe et al. |
| 2015/0269809 | A1 | 9/2015 | Smith |
| 2015/0287269 | A1 | 10/2015 | Berman |
| 2015/0356833 | A1 | 12/2015 | Aoki et al. |
| 2015/0379831 | A1 | 12/2015 | Lee et al. |
| 2016/0042597 | A1 | 2/2016 | Olive |
| 2016/0155303 | A1 | 6/2016 | Aoki et al. |
| 2017/0154498 | A1 | 6/2017 | Olive |
| 2017/0372558 | A1 | 12/2017 | You et al. |
| 2018/0130303 | A1 | 5/2018 | Lamb |
| 2018/0268655 | A1 | 9/2018 | Olive |
| 2018/0268659 | A1 | 9/2018 | Chesworth et al. |
| 2019/0102992 | A1 | 4/2019 | You et al. |

(56) References Cited

U.S. PATENT DOCUMENTS

| | | | |
|---|---|---|---|
| 2019/0236905 A1 | 8/2019 | Washington et al. | |
| 2023/0033113 A1* | 2/2023 | Penacho | G07F 17/3211 |

FOREIGN PATENT DOCUMENTS

| | | | |
|---|---|---|---|
| AU | 2014202042 | A1 | 5/2014 |
| AU | 2015210489 | A1 | 2/2016 |
| GB | 2097160 | A | 10/1982 |
| GB | 2097160 | B | 5/1984 |
| GB | 2144568 | A | 3/1985 |
| GB | 2144568 | B | 9/1985 |
| GB | 2251112 | A | 6/1992 |

OTHER PUBLICATIONS

Flying Carpet game brochure, Copyright 2008 Bally.
Golden Knight game brochure, Copyright 2010 IGT.
Sultan of Mars game brochure, Copyright 2011 IGT.
The Amulet and the Charm game brochure, Copyright 2011 IGT.

* cited by examiner

GAMING MACHINE AND METHOD WITH SYMBOL ARRAY UNLOCKING FEATURE

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2021, SG Gaming, Inc.

FIELD OF THE INVENTION

The present invention relates to a technological improvement to gaming systems, gaming machines, and methods and, more particularly, to new and improved animations in connection with a symbol array unlocking feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to an embodiment of the present invention, there is provided a gaming system, gaming machine, and method that utilize an electronic display device configured to display a plurality of symbol arrays associated with respective sets of symbol-bearing reels. The arrays may be locked or unlocked. In response to a reel spin that generates a stack of value-bearing symbols in an unlocked array, a locked array is unlocked and the stack is held in its array for a number of subsequent reel spins. Payouts are provided for winning combinations of standard symbols and value-bearing symbols in the unlocked arrays.

Additional aspects of the invention will be apparent to those of ordinary skill in the art in view of the detailed description of various embodiments, which is made with reference to the drawings, a brief description of which is provided below.

Figure 1:
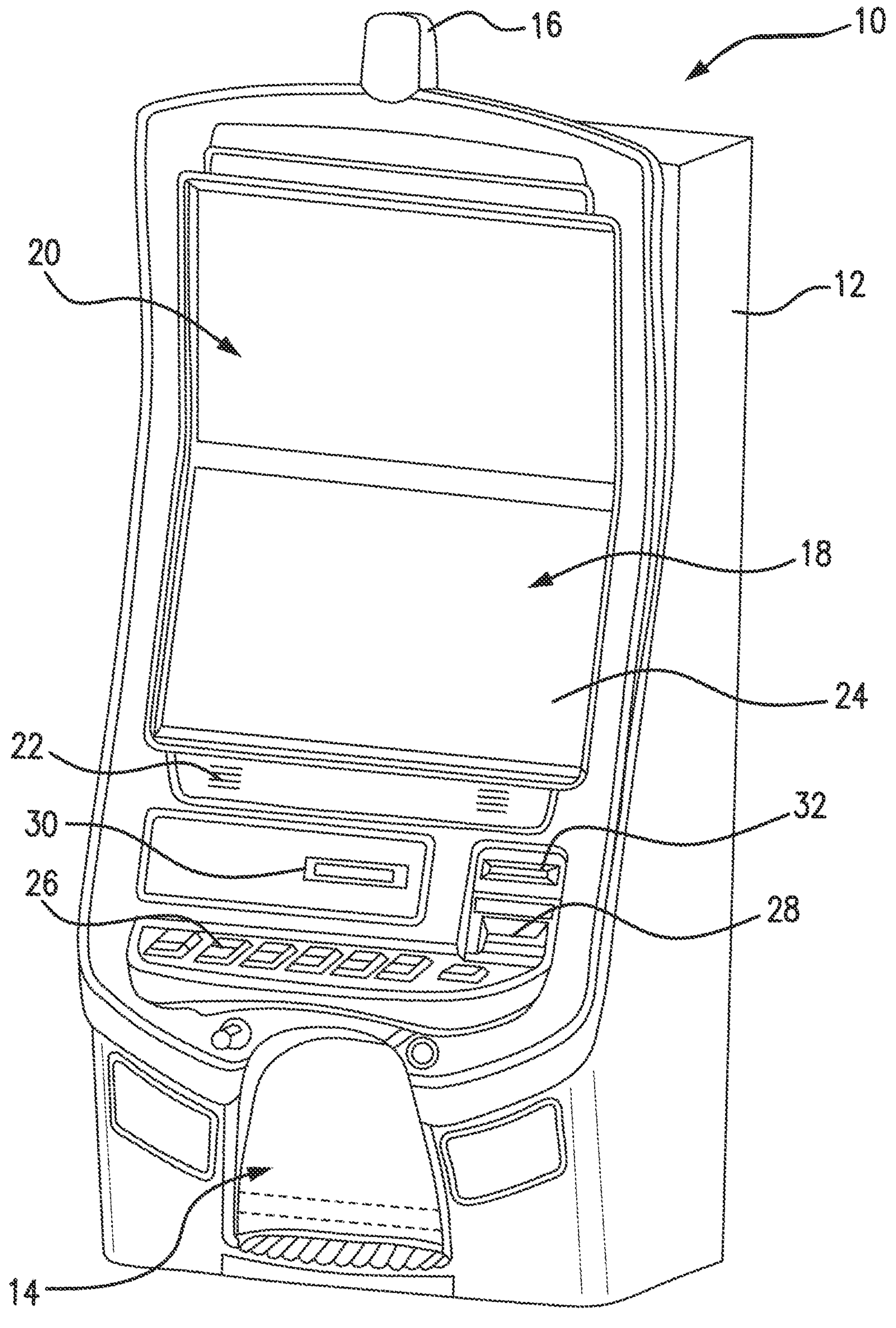
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaining machine 10 is an electromechanical gaming terminal configured to play mechanical slots, whereas in other aspects, the gaming machine is an electronic gaining terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaining machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary display 18, a secondary display 20, and one or more audio speakers 22. The primary display 18 or the secondary display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 200 (see FIG. 4). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 200 (see FIG. 4), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
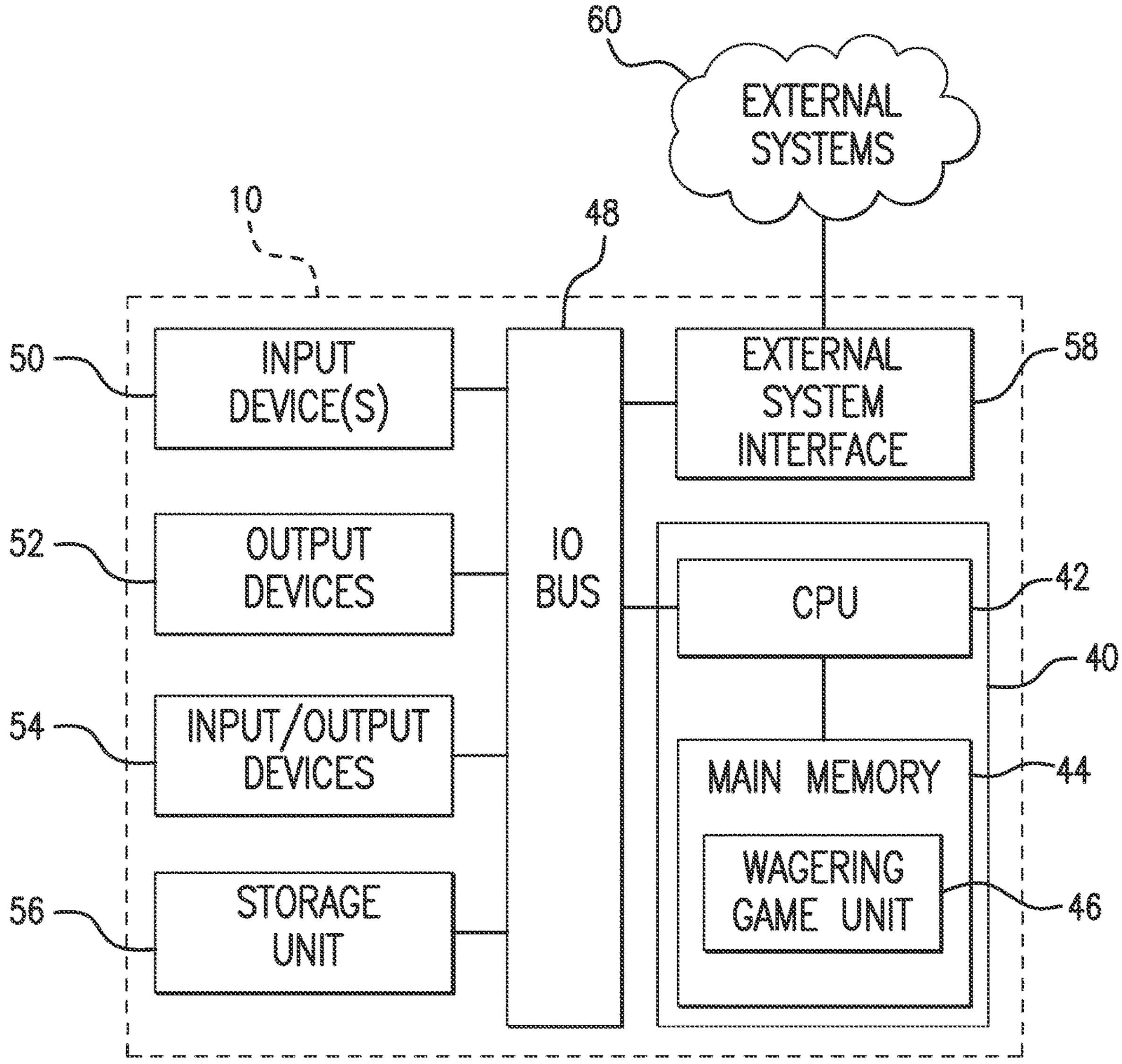
FIG. 2 is a schematic view of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaining terminal, computer, etc.). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaining apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

Figure 3:
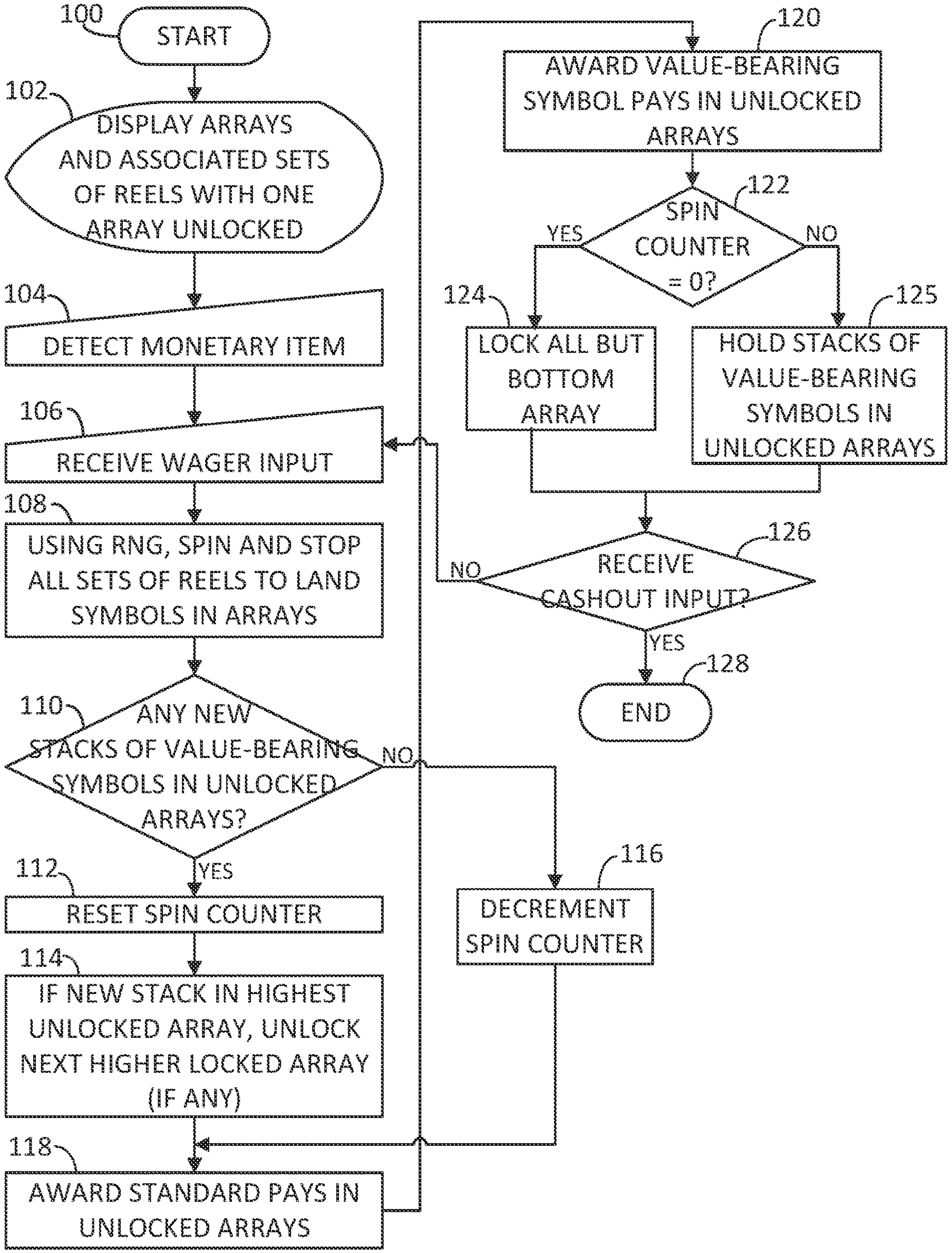
FIG. 3 is a flowchart for a data processing method that corresponds to instructions executed by a controller, according to an embodiment of the present invention.

Referring now to FIG. 3, there is shown a flowchart representing one data processing method corresponding to at least some instructions stored and executed by the game-logic circuitry 40 in FIG. 2 to perform operations according to an embodiment of the present invention. Some operations or steps may be performed in a different order than shown in the flowchart. When describing the data processing method, reference is made to one or more of the game cycle outcomes (i.e., spin outcomes) represented in FIGS. 4-14, FIGS. 4-14 show respective spin outcomes after the reels have been spun and stopped to land symbols in the three symbol arrays 210, 212. and 214 depicted in each figure.

The data processing method commences at step 100. At step 102, the game-logic circuitry directs an electronic display device (e.g., video display) of the gaming machine to display a plurality of symbol arrays associated with respective sets of symbol-bearing reels. Initially, only one of the arrays is unlocked (i.e., active); the remaining arrays are locked (i.e., inactive). The symbol positions of each array may be arranged in a variety of configurations, formats, or structures and may comprise a plurality of rows and columns. The rows of the array are oriented in a generally horizontal direction, and the columns of the array are oriented in a generally vertical direction. The symbol positions in each row of the array are horizontally aligned with each other, and the symbol positions in each column of the array are vertically aligned with each other. The number of symbol positions in different rows and/or different columns may vary from each other. The set of reels for an array may be associated with the respective columns of the array such that the reels spin vertically and each reel populates a respective column. In another embodiment, the reels may be associated with the respective rows of the array such that the reels spin horizontally and each reel populates a respective row. In yet another embodiment, the reels may be associated with respective individual symbol positions of the array such that each reel populates only its respective symbol position.

Figure 4:
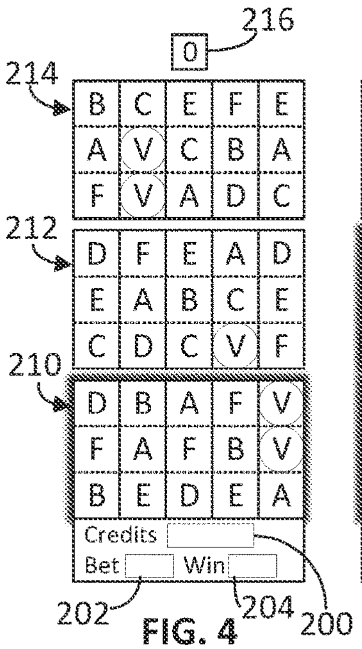
FIGS. 4-14 are exemplary representations of a series of game cycle outcomes (i.e., spin outcomes) according to an embodiment of the present invention.

In the example shown in FIGS. 4-14, the electronic display device displays three arrays: a bottom array 210, a middle array 212, and a top array 214. The bottom array 210 is initially unlocked, while the middle and top arrays 212 and 214 are locked. To differentiate between the locked and unlocked arrays, the game may apply a border, pattern, color change, background change, watermark, or other distinguishing characteristic to the unlocked or locked array. In FIG. 4, for example, the unlocked bottom array 210 has a glowing border that is absent from the locked arrays 212 and 214. Each array is associated with a respective set of five symbol-bearing reels. When spun and stopped, each reel populates a respective column of the array. Each set of five reels bears a plurality of symbols. In one embodiment, the plurality of symbols include standard symbols A, B, C, D, E, and F and value-beating symbols V.

Figure 5:
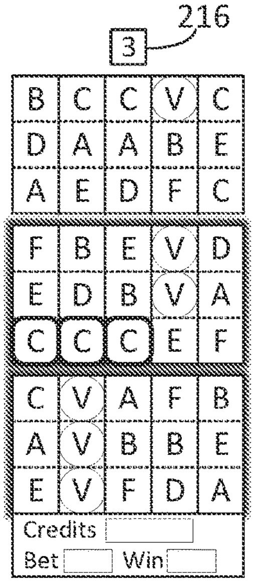

Each value-bearing symbol V is associated with a credit or currency value indicated on the symbol itself. The value on a particular symbol V may be fixed or variable (e.g., random) from one game cycle to the next. Different value-bearing symbols V on the reels may have different values. Each reel may contain one or more stacks (i.e., clumps) of value-bearing symbols V that appear adjacent to each other along the reel. The values of the value-bearing symbols V in any given stack may be the same or different. A stack of value-bearing symbols V may consist of two, three, four, or more adjacent symbols V. For example, FIG. 4 illustrates a stack of two value-bearing symbols V in each of the bottom and top arrays 210 and 214, and FIG. 5 illustrates a stack of three value-bearing symbols V in the bottom array 210. The value-bearing symbols V in the top array 214 may have higher values than the value-bearing symbols V in the middle array 212 which, in turn, may have higher values than the value-bearing symbols V in the bottom array 210.

Returning to FIG. 3, at step 104, the game-logic circuitry detects, via a value input device, a physical item associated with a monetary value that establishes a credit balance. The credit balance may be shown on a credit meter 200 (see FIG. 4) of the gaming machine.

At step 106, the game-logic circuitry initiates a wagering game cycle in response to an input indicative of a wager covered by the credit balance. The wager may be shown on a bet meter 202 (see FIG. 4). To initiate a spin of the reels, the player may press a "Spin" or "Max Bet" key on a button panel or touch screen.

At step 108, using an RING, the game-logic circuitry spins and stops all sets of reels to randomly land symbols from each set of reels in the respective array in visual association with one or more paylines (also known as lines, ways, patterns, or arrangements). The reel spin is animated by depicting symbol-bearing strips moving vertically across the display and synchronously updating the symbols visible on each strip as the strip moves across the display. In the example shown in FIGS. 4-14, the bottom set of five reels populates the bottom array 210, the middle set of five reels populates the middle array 212, and the top set of five reels populates the top array 214.

At step 110, the game-logic circuitry determines whether or not a new stack of value-bearing symbols V landed and completely filled any column of any unlocked array. In the example shown in FIGS. 4-14, each of the columns in each of the arrays 210, 212, and 214 contains three symbol positions. Thus, to fill a column, a stack of value-bearing symbols V would need to consist of at least three symbols V and would need to land with three of its symbols V in the respective three symbol positions of a column. In FIG. 5, for example, a new stack of value-bearing symbols V filled the second column of the bottom array 210.

If a new stack of value-bearing symbols did not fill any column of any unlocked array at step 110. the game-logic circuitry decrements a spin counter and then proceeds to step 118. In the example shown in FIG. 4, a new stack of value-bearing symbols V did not fill any column of the unlocked bottom array 210. As a result, assuming a spin counter 216 was at zero prior to the spin outcome in FIG. 4, the spin counter 216 stays at zero because it cannot decrement below zero.

If, however, a new stack of value-bearing symbols V filled any column of any unlocked array at step 110, the game-logic circuitry resets the spin counter to an initial value at step 112. If the new stack was in the highest unlocked array, the game-logic circuitry unlocks a locked array (if any) immediately above the highest unlocked array at step 114. The game-logic circuitry then proceeds to step 118. In the example shown in FIG. 5, a new stack of value-bearing symbols V filled the second column of the unlocked bottom array 210. As a result, the spin counter 216 was reset to an initial value of 3 spins, and the middle array 212 was unlocked (relative to its locked state in the prior spin outcome in FIG. 4) as shown by its glowing border.

At step 118, the game-logic circuitry awards standard pays in unlocked arrays in accordance with a pay table. Any "pays" in locked arrays are not awarded. The pay table may, for example, include "line pays" and "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Each payline preferably consists of a single symbol position in each column of the array. The number of paylines may be as few as one or as many as possible given that each payline consists of a single symbol position in each column of the array. The awarded pays are added to a win meter such as meter 204 in FIGS. 4-14. In the example shown in FIGS. 4-14, standard pays are limited to line pays along three horizontal paylines starting from the leftmost reel: a first payline spanning the middle row of each unlocked array, a second payline spanning the top row of each unlocked array, and a third payline spanning the bottom row of each unlocked array. FIG. 5, for example, depicts a line pay of three C symbols along the bottom row of the unlocked middle array 212.

Figure 6:
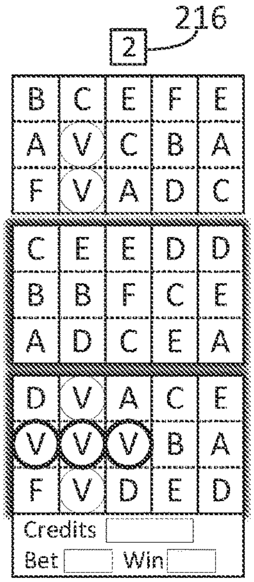

At step 120, the game-logic circuitry awards value-hearing symbol pays in unlocked arrays in accordance with a pay table. Any "pays" in locked arrays are not awarded. As with standard pays, the pay table may, for example, include line pays and scatter pays. In one embodiment, the pays for value-bearing symbols V are limited to left-to-right line pays in which the value-bearing symbols appear along a payline starting from the leftmost reel. The payout for such a pay may be the sum of the values indicated on the value-bearing symbols V in the line pay. The awarded pays are added to a win meter such as the meter 204 in FIGS. 4-14. In the example shown in FIGS. 4-14, value-bearing symbol pays are limited to line pays along three horizontal paylines starting from the leftmost reel: a first payline spanning the middle row of each unlocked array, a second payline spanning the top row of each unlocked array, and a third payline spanning the bottom row of each unlocked array. FIG. 6, for example, depicts a line pay of three value-bearing symbols V along the middle row of the unlocked bottom array 210.

In another embodiment, step 114 is performed after awarding any standard pays (step 118) and value-bearing symbol pays (step 120) such that any newly unlocked arrays can provide payouts in the next spin outcome, not the current spin outcome.

At step 122, the game-logic circuitry determines whether or not the spin counter has reached zero. If not, the game-logic circuitry holds (carries over) any column-filling stacks of value-bearing symbols V in any unlocked arrays from the current spin to the next spin at step 125, and then proceeds to step 126. For example, the spin outcome in FIG. 5 has a column-filling stack of symbols V in the unlocked bottom array 210 which is carried over to the spin outcome in FIG. 6. If, however, the spin counter has reached zero at step 122, the game-logic circuitry locks all but the bottom array at step 124 (or, if all but the bottom array are already locked, the game-logic circuitry keeps them locked), and then proceeds to step 126. For example, after awarding any standard pays and value-bearing symbol pays in FIG. 13, the game-logic circuitry would relock the middle and top arrays 212 and 214 because the spin counter 216 has reached zero.

At step 126, the game-logic circuitry determines whether or not it has received a cashout input via at least one of the one or more electronic input devices of the gaming machine. If it has not received a cashout input, the game-logic circuitry waits for the next wager input at step 106. If, however, it has received a cashout input, the game-logic circuitry initiates a payout from the credit balance on the credit meter such as the meter 200 in FIGS. 4-14. The data processing method then ends at step 128.

Although the data processing method in FIG. 3 depicts each spin outcome as being part of a wagered base game, with a wager input (step 106) preceding each spin outcome, the method may be modified to have a base game and a bonus game triggered during play of the underlying base game. The base game may be a single or multi-array slot game. The bonus game may be a series of free spins utilizing steps 102 and 108 through 125 of the method in FIG. 3. In this case, when the bonus game commences, the spin counter may be initialized to a reset value, such as three. The series of free spins would continue until the spin counter reaches zero, at which point the bonus game would end and the method would return to the base game.

FIGS. 4-14 depict exemplary representations of a series of wagering game cycle outcomes (i.e., spin outcomes). Each figure represents a different outcome in the series following the performance of steps 106 through 120 in FIG. 3. The series commences with the spin counter 216 at zero, the bottom array 210 unlocked, and the middle and top arrays 212 and 214 locked. In the description of each of FIGS. 4-14 below, reference is made to certain applicable steps from FIG. 3.

Referring to FIG. 4:

No new column-filling stacks of value-bearing symbols V in the unlocked bottom array 210 (step 110).

Spin counter 216 remains at zero (step 116). The middle and top arrays 212 and 214 remain locked.

No standard pays in the unlocked bottom array 210 (step 118).

No value-bearing symbol pays in the unlocked bottom array 210 (step 120).

Referring to FIG. 5:

A new column-filling stack of value-bearing symbols V in the second column of the unlocked bottom array 210 (step 110).

Spin counter 216 is reset to three spins (step 112). Although the reset value in this example is three, it could be another value such as four or five.

Because the new column-filling stack of value-bearing symbols V is in the highest unlocked array, which in this case is the bottom array 210, the next higher array 212 is unlocked (step 114).

Standard left-to-right pay of three C symbols along the bottom row of the now unlocked middle array 212 (step 118).

No value-bearing symbol pays in the unlocked bottom or middle arrays 210 and 212 (step 120).

Because the spin counter is not equal to zero (step 122), the column-filling stack of value-bearing symbols V in the bottom array 210 is carried over to the next spin outcome (step 125). The middle array 212 remains unlocked for the next spin outcome.

Referring to FIG. 6:

No new column-filling stacks of value-bearing symbols V in the unlocked bottom or middle arrays 210 and 212 (step 110).

Spin counter 216 decrements from three to two (step 116). The top array 214 remains locked.

No standard pays in the unlocked bottom or middle arrays 210 and 212 (step 118).

A left-to-right value-bearing symbol pay of three value-bearing symbols V along the middle row of the unlocked bottom array 210 (step 120).

Because the spin counter is not equal to zero (step 122), the column-tilling stack of value-bearing symbols V in the bottom array 210 is carried over to the next spin outcome (step 125). The middle array 212 remains unlocked for the next spin outcome.

Figure 7:
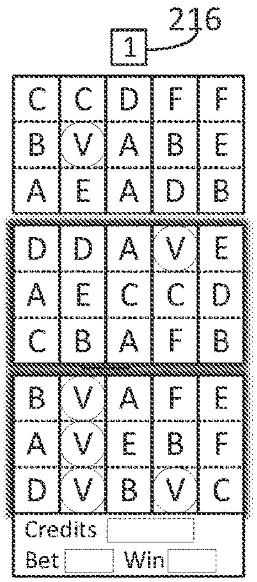

Referring to FIG. 7:

No new column-filling stacks of value-bearing symbols V in the unlocked bottom or middle arrays 210 and 212 (step 110).

Spin counter 216 decrements from two to one (step 116). The top array 214 remains locked.

No standard pays in the unlocked bottom or middle arrays 210 and 212 (step 118).

No value-bearing symbol pays in the unlocked bottom or middle arrays 210 and 212 (step 120).

Because the spin counter is not equal to zero (step 122), the column-filling stack of value-bearing symbols V in the bottom array 210 is carried over to the next spin outcome (step 125). The middle array 212 remains unlocked for the next spin outcome.

Figure 8:
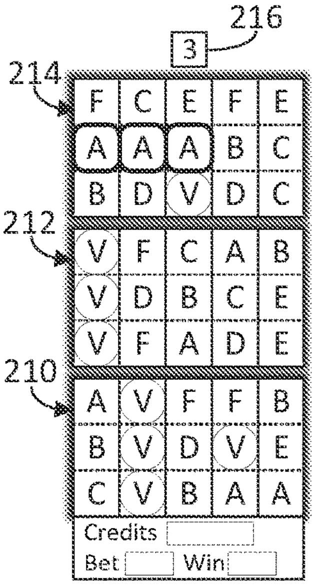

Referring to FIG. 8:

A new column-filling stack of value-bearing symbols V in the first column of the unlocked middle array 212 (step 110).

Spin counter 216 is reset to three spins (step 112).

Because the new column-filling stack of value-bearing symbols V is in the highest unlocked array, which in this case is the middle array 212, the next higher array 214 is unlocked (step 114).

Standard left-to-right pay of three A symbols in the now unlocked top array 214 (step 118).

No value-bearing symbol pays in the unlocked bottom, middle, or top arrays 210, 212, and 214 (step 120).

Because the spin counter is not equal to zero (step 122), the column-filling stacks of value-bearing symbols V in the bottom and middle arrays 210 and 212 are carried over to the next spin outcome (step 125). All arrays remain unlocked for the next spin outcome.

Figure 9:
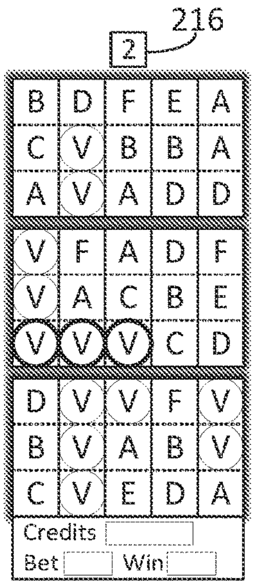

Referring to FIG. 9:

No new column-filling stacks of value-bearing symbols V in the unlocked arrays 210, 212, or 214 (step 110).

Spin counter 216 decrements from three to two (step 116).

No standard pays in the unlocked arrays 210, 212, or 214 (step 118).

A left-to-right value-bearing symbol pay of three value-bearing symbols V along the bottom row of the unlocked middle array 212 (step 120).

Because the spin counter is not equal to zero (step 122), the column-filling stacks of value-bearing symbols V in the bottom and middle arrays 210 and 212 are carried over to the next spin outcome (step 125). All arrays remain unlocked for the next spin outcome.

Figure 10:
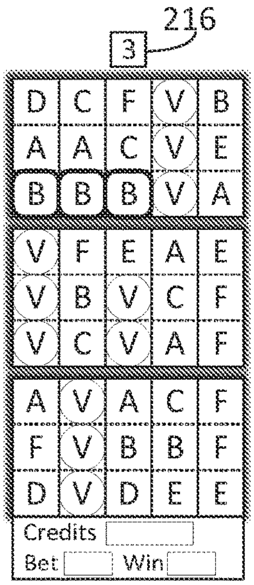

Referring to FIG. 10:

A new column-filling stack of value-bearing symbols V in the fourth column of the unlocked top array 214 (step 110).

Spin counter 216 is reset to three spins (step 112).

The new column-filling stack of value-bearing symbols V is in the highest unlocked array, which in this case is the top array 214. But because there are no arrays above the top array 214, no further arrays are unlocked (step 114).

Standard left-to-right pay of three B symbols along the bottom row of the unlocked top array 214 (step 118).

No value-bearing symbol pays in the unlocked bottom, middle, or top arrays 210, 212, and 214 (step 120).

Because the spin counter is not equal to zero (step 122), the column-filling stacks of value-bearing symbols V in the bottom, middle, and top arrays 210, 212, and 214 are carried over to the next spin outcome (step 125). All arrays remain unlocked for the next spin outcome.

Figure 11:
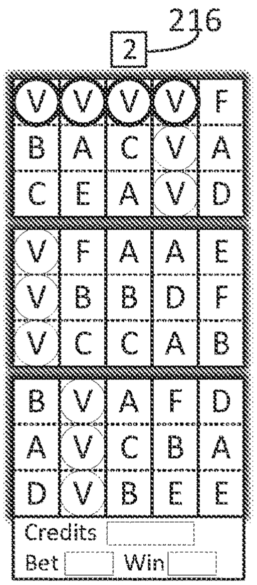

Referring to FIG. 11:

No new column-filling stacks of value-bearing symbols V in the unlocked bottom, middle, or top arrays 210, 212, and 214 (step 110).

Spin counter 216 decrements from three to two (step 116).

No standard pays in the unlocked bottom, middle, or top arrays 210, 212, and 214 (step 118).

A left-to-right value-beating symbol pay of four value-bearing symbols V along the top row of the unlocked top array 214 (step 120).

Because the spin counter is not equal to zero (step 122), the column-filling stacks of value-bearing symbols V in the bottom, middle, and top arrays 210, 212, and 214 are carried over to the next spin outcome (step 125). All arrays remain unlocked for the next spin outcome.

Figure 12:
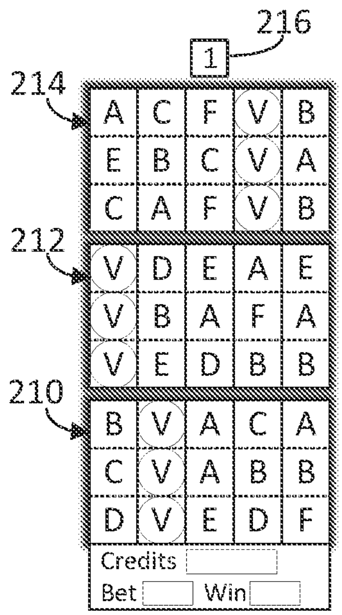

Referring to FIG. 12:

No new column-filling stacks of value-bearing symbols V in the unlocked bottom, middle, or top arrays 210, 212, and 214 (step 110).

Spin counter 216 decrements from two to one (step 116).

No standard pays in the unlocked bottom, middle, or top arrays 210, 212, and 214 (step 118).

No value-bearing symbol pays in the unlocked bottom, middle, or top arrays 210, 212, and 214 (step 120).

Because the spin counter is not equal to zero (step 122), the column-filling stacks of value-bearing symbols V in the bottom, middle, and top arrays 210, 212, and 214 are carried over to the next spin outcome (step 125). All arrays remain unlocked for the next spin outcome.

Figure 13:
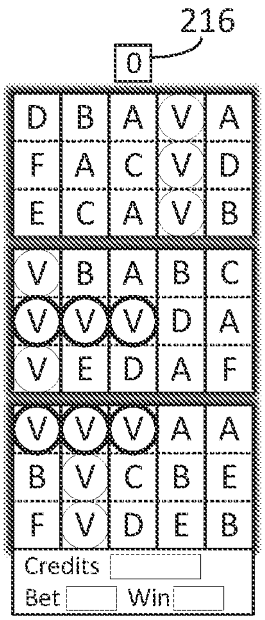

Referring to FIG. 13:

No new column-filling stacks of value-bearing symbols V in the unlocked bottom, middle, or top arrays 210, 212, and 214 (step 110).

Spin counter 216 decrements from one to zero (step 116).

No standard pays in the unlocked bottom, middle, or top arrays 210, 212, and 214 (step 118).

Left-to-right value-bearing symbol pays of three value-bearing symbols V along the top row of the unlocked bottom array 210 and three value-bearing symbols V along the middle row of the unlocked middle array 212 (step 120).

Because the spin counter is equal to zero (step 122), the middle and top arrays 212 and 214 are re-locked for the next spin outcome (step 124). And the column-filling stacks of value-bearing symbols V in the bottom, middle, and top arrays 210, 212, and 214 are not carried over to the next spin outcome.

Figure 14:
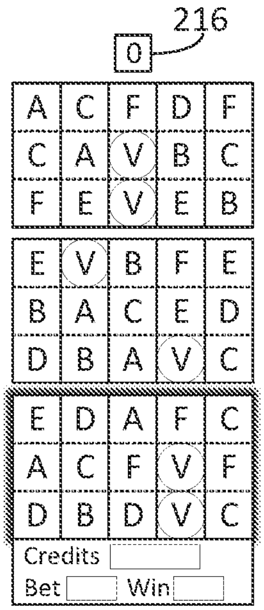

Referring to FIG. 14:

No new column-filling stacks of value-bearing symbols V in the unlocked bottom array 210 (step 110).

Spin counter 216 remains at zero (step 116). The middle and top arrays 212 and 214 remain locked.

No standard pays in the unlocked bottom array 210 (step 118).

No value-bearing symbol pays in the unlocked bottom array 210 (step 120).

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a gaming machine, the gaming machine including a gaming cabinet and game-logic circuitry secured within a locked box inside the gaming cabinet, the game-logic circuitry including memory storing programming for a random number generator (RNG) and a wagering game, the method comprising the operations of:

prior to executing the wagering game, executing an authentication program on the gaming machine to authenticate the programming;

displaying, on an electronic display device under control of the game-logic circuitry, first, second, and third arrays visually associated with respective first, second, and third sets of symbol-bearing reels, the first array being unlocked, the second and third arrays being initially locked and bearing a distinguishing characteristic relative to the first array to indicate that the second and third arrays are initially locked;

conducting, by the game-logic circuitry, spins of the first, second, and third sets of reels of the wagering game, each spin including using the RNG to randomly determine an outcome of the spin; and animating, on the electronic display device, spinning and stopping the sets of reels to land symbols from each set of reels in its respective array in accordance with the randomly-determined outcome;

in response to any of the spins generating a stack of value-bearing symbols in the first array, holding the stack of value-bearing symbols in the first array and unlocking the second array for at least a first number of the spins, the third array bearing a distinguishing characteristic relative to the first and second arrays to indicate that the third array remains locked;

in response to generating a stack of value-bearing symbols in the second array within the first number of the spins, holding the stacks of value-bearing symbols in the first and second arrays and unlocking the third array for at least a second number of the spins, and for each spin associated with any unlocked ones of the first, second, and third arrays, presenting, on the electronic display device, payouts for any winning combinations of value-bearing symbols resulting from the spin, the payout for each such winning combination of value-bearing symbols being based on values borne by the value-bearing symbols in the combination.

2. The method of claim 1, wherein in response to not generating a stack of value-bearing symbols in the second array within the first number of the spins, discontinuing the holding of the stack of value-bearing symbols in the first array and relocking the second array.

3. The method of claim 1, wherein in response to generating a stack of value-bearing symbols in the third array within the second number of the spins, holding the stacks of value-bearing symbols in the first, second, and third arrays for at least a third number of the spins.

4. The method of claim 3, wherein in response to not generating a stack of value-bearing symbols in the third array within the second number of spins, discontinuing the holding of the stacks of value-bearing symbols in the first and second arrays and relocking the second and third arrays.

5. The method of claim 1, wherein each of the first number of the spins and the second number of the spins is a predetermined number.

6. The method of claim 5, wherein the displaying operation includes displaying a spin counter;

wherein in response to any of the spins generating a stack of value-bearing symbols in the first array, initializing the spin counter to the first number and decrementing the spin counter with each spin in the first number of the spins; and wherein in response to generating a stack of value-bearing symbols in the second array within the first number of the spins, resetting the spin counter to the second number and decrementing the spin counter with each spin in the second number of spins.

7. The method of claim 1, wherein the value-bearing symbols in the stack of value-bearing symbols in the second array have higher values than the value-bearing symbols in the stack of value-bearing symbols in the first array.

8. The method of claim 3, wherein the value-bearing symbols in the stack of value-bearing symbols in the third array have higher values than the value-bearing symbols in the stack of value-bearing symbols in the second array, and wherein the value-bearing symbols in the stack of value-bearing symbols in the second array have higher values than the value-bearing symbols in the stack of value-bearing symbols in the first array.

9. The method of claim 1, wherein each spin of the first, second, and third sets of reels includes spinning and stopping the first, second, and third sets of reels to land symbols from the reels in the respective first, second, and third arrays.

10. The method of claim 1, further comprising:

for each spin of the first set of reels, receiving, via at least one of one or more electronic input devices, an input indicative of a wager;

detecting, via a value input device, a physical item associated with a monetary value that establishes a credit balance; and receiving, via at least one of the one or more electronic input devices, a cashout input that initiates a payout from the credit balance.

11. A method of operating a gaming machine, the gaming machine including a gaming cabinet and game-logic circuitry secured within a locked box inside the gaming cabinet, the game-logic circuitry including memory storing programming for a random number generator (RNG) and a wagering game, the method comprising the operations of:

prior to executing the wagering game, executing an authentication program on the gaming machine to authenticate the programming;

displaying, on an electronic display device under control of the game-logic circuitry, first and second arrays visually associated with respective first and second sets of symbol-bearing reels, the first array being unlocked, the second array being initially locked and bearing a distinguishing characteristic relative to the first array to indicate that the second array is initially locked;

conducting, by the game-logic circuitry, a spin of the first set of reels of the wagering game, the spin including using the RNG to randomly determine an outcome of the spin; and animating, on the electronic display device, spinning and stopping the first set of reels to land symbols from the first set of reels in the first array in accordance with the randomly-determined outcome;

in response to the spin generating a stack of value-bearing symbols in the first array, holding the stack of value-bearing symbols in the first array and unlocking the second array for at least a first number of spins of the first and second sets of reels;

after the at least the first number of spins, discontinuing the holding of the stack of value-bearing symbols in the first array and relocking the second array, the second array bearing a distinguishing characteristic relative to the first array to indicate that the second array is relocked; and for each spin associated with any unlocked ones of the first and second arrays, presenting, on the electronic display device, payouts for any winning combinations of value-bearing symbols resulting from the spin, the payout for each such winning combination of value-bearing symbols being based on values borne by the value-bearing symbols in the combination.

12. The method of claim 11, wherein in response to not generating a stack of value-bearing symbols in the second array within the first number of spins, discontinuing the holding of the stack of value-bearing symbols in the first array and relocking the second array.

13. The method of claim 12, wherein in response to generating a stack of value-bearing symbols in the second array within the first number of the spins, holding the stacks of value-bearing symbols in the first and second arrays for at least a second number of spins of the first and second sets of reels.

14. The method of claim 13, wherein each of the first number of the spins and the second number of the spins is a predetermined number.

15. The method of claim 14, wherein the displaying operation includes displaying a spin counter;

wherein in response to the spin generating a stack of value-bearing symbols in the first array, initializing the spin counter to the first number and decrementing the spin counter with each spin in the first number of the spins; and wherein in response to generating a stack of value-bearing symbols in the second array within the first number of the spins, resetting the spin counter to the second number and decrementing the spin counter with each spin in the second number of spins.

16. The method of claim 13, wherein the value-bearing symbols in the stack of value-bearing symbols in the second array have higher values than the value-bearing symbols in the stack of value-bearing symbols in the first array.

17. The method of claim 11, wherein each spin of the first and second sets of reels includes spinning and stopping the first and second sets of reels to land symbols from the reels in the respective first and second arrays.

18. The method of claim 11, further comprising:

for each spin of the first set of reels, receiving, via at least one of one or more electronic input devices, an input indicative of a wager, detecting, via a value input device, a physical item associated with a monetary value that establishes a credit balance; and receiving, via at least one of the one or more electronic input devices, a cashout input that initiates a payout from the credit balance.

* * * * *